（12） United States Patent
Chung (10) Patent No.: US 11,105,251 B2
(45) Date of Patent: Aug. 31, 2021

(54) CATALYTIC CONVERTER FOR VEHICLE

(71) Applicants: HYUNDAI MOTOR COMPANY, Seoul (KR); KIA MOTORS CORPORATION, Seoul (KR)

(72) Inventor: Hee Chan Chung, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/930,673

(22) Filed: May 13, 2020

(65) Prior Publication Data

US 2021/0172367 A1 Jun. 10, 2021

(30) Foreign Application Priority Data

Dec. 6, 2019 (KR) ................. 10-2019-0161905

(51) Int. Cl.
*F01N 13/18* (2010.01)
*F01N 3/28* (2006.01)

(52) U.S. Cl.
CPC ........... *F01N 13/1844* (2013.01); *F01N 3/28* (2013.01); *F01N 2240/20* (2013.01); *F01N 2450/20* (2013.01)

(58) Field of Classification Search
CPC .. F01N 3/10–108; F01N 3/28; F01N 13/1844; F01N 2450/20; F01N 2240/20
USPC .................................. 60/280, 299–302, 324
See application file for complete search history.

(56) References Cited

U.S. PATENT DOCUMENTS

| | | | | |
|---|---|---|---|---|
| 5,103,641 | A * | 4/1992 | Maus | F01N 3/281 422/171 |
| 5,140,812 | A * | 8/1992 | Cornelison | F01N 3/281 60/300 |
| 5,317,869 | A * | 6/1994 | Takeuchi | F01N 3/2026 60/300 |
| 5,866,077 | A * | 2/1999 | Sakurai | F01N 3/281 422/174 |
| 5,902,557 | A * | 5/1999 | Yotsuya | B01J 35/04 422/174 |
| 6,023,930 | A * | 2/2000 | Abe | F01N 3/0253 422/173 |
| 7,581,387 | B2 * | 9/2009 | Bui | B01F 3/04049 60/286 |
| 7,784,273 | B2 * | 8/2010 | Kanaya | B01D 53/9431 60/286 |
| 7,805,932 | B2 * | 10/2010 | Oxborrow | F01N 3/2892 60/324 |

(Continued)

OTHER PUBLICATIONS

Campbell et al., Effect of Catalyst Inlet Cone Flow Mal-Distribution on Emissions Performance of a Close-Coupled Catalytic Converter, SAE Technical Paper Series, 2004-01-1489, 13 pp., Mar. 8-11, 2004.

*Primary Examiner* — Mark A Laurenzi
*Assistant Examiner* — Mickey H France (57) ABSTRACT

A catalytic converter for a vehicle includes: an inlet cone portion connected to an exhaust side of a turbocharger; a converter housing connected to the inlet cone portion and forming an exhaust gas flow passage; at least one catalyst element installed in the exhaust gas flow passage of the converter housing; and a pin member installed inside the inlet cone portion corresponding to the front end surface of the catalyst element.

7 Claims, 6 Drawing Sheets

(56) References Cited

U.S. PATENT DOCUMENTS

| | | | | |
|---|---|---|---|---|
| 8,307,634 B2 * | 11/2012 | Lauga | F01N 3/2066 | |
| | | | 60/286 | |
| 8,353,151 B2 * | 1/2013 | Tsujimoto | F01N 3/025 | |
| | | | 60/286 | |
| 8,544,259 B2 * | 10/2013 | Tsujimoto | F01N 3/36 | |
| | | | 60/286 | |
| 8,584,451 B2 * | 11/2013 | Itoh | F01N 3/2066 | |
| | | | 60/324 | |
| 8,615,984 B2 * | 12/2013 | Kornherr | B01F 5/0612 | |
| | | | 60/286 | |
| 8,683,790 B2 * | 4/2014 | Ranganathan | B01F 3/04049 | |
| | | | 60/324 | |
| 8,683,791 B2 * | 4/2014 | Crane | F01N 1/086 | |
| | | | 60/324 | |
| 8,715,601 B2 * | 5/2014 | Makkee | F01N 3/206 | |
| | | | 423/213.5 | |
| 8,925,303 B2 * | 1/2015 | Tsujimoto | F01N 3/2033 | |
| | | | 60/286 | |
| 9,163,548 B2 * | 10/2015 | Henderson, IV | F01N 13/10 | |
| 9,212,585 B2 * | 12/2015 | Mori | F01N 3/103 | |
| 9,528,421 B2 * | 12/2016 | Hashima | F01N 3/106 | |
| 9,605,573 B2 * | 3/2017 | Solbrig | B01F 5/0612 | |
| 9,856,774 B2 * | 1/2018 | Di Perna | B01D 53/9431 | |
| 10,247,079 B2 * | 4/2019 | Tabata | F02B 37/00 | |
| 10,267,192 B2 * | 4/2019 | Takeshima | F01N 3/023 | |
| 10,280,856 B2 * | 5/2019 | Fujiwara | F01N 3/0885 | |
| 10,329,990 B2 * | 6/2019 | Cozza | F01N 13/08 | |
| 10,385,756 B2 * | 8/2019 | Kuramashi | F01N 3/10 | |
| 10,494,973 B2 * | 12/2019 | Takayanagi | F01N 3/2803 | |
| 10,557,396 B2 * | 2/2020 | Kimura | F02D 41/0255 | |
| 10,626,768 B2 * | 4/2020 | Tanaka | F02D 41/1441 | |
| 10,669,916 B2 * | 6/2020 | Kimura | F02B 37/02 | |
| 10,718,260 B2 * | 7/2020 | Ito | F02D 41/0007 | |
| 10,934,912 B2 * | 3/2021 | Baron Von Ceumern-Lindenstjerna | F01N 3/101 | |

* cited by examiner

| Classification | Comparative embodiment | Exemplary embodiment | Effect of application |
|---|---|---|---|
| Uniformity of flow rate | 0.84 | 0.89 | 6% ↑ |
| Back pressure of system | 14.5 kPa | 11.7 kPa | 2.8 kPa ↓ |

CATALYTIC CONVERTER FOR VEHICLE

CROSS-REFERENCE TO RELATED APPLICATION

This application claims priority to and the benefit of Korean Patent Application No. 10-2019-0161905, filed on Dec. 6, 2019, the entire contents of which are incorporated herein by reference.

FIELD

The present disclosure relates to an exhaust system for a vehicle. More particularly, the present disclosure relates to a catalytic converter for a vehicle for purifying exhaust gas discharged from an engine.

BACKGROUND

The statements in this section merely provide background information related to the present disclosure and may not constitute prior art.

In general, exhaust gas discharged from a vehicle's turbocharger engine is purified by a chemical reaction of a catalytic converter. In the turbocharged engine, the exhaust side of the turbocharger is connected to the catalytic converter through a cone-shaped exhaust connection unit. The exhaust connection unit functions to direct exhaust gas to the front end surface of the catalytic converter.

In order to cope with the recently tightened emission regulations, it is desired to improve the purification efficiency of the catalytic converter. As a method of improving the purification efficiency of the catalytic converter, there is a method of increasing the volume of the catalyst or improving the uniformity of the exhaust flow rate with respect to the front surface of the catalyst.

In the case of a recently developed catalytic converter, the volume of the catalyst is in a tendency to increase, and when the volume of the catalyst is increased within a limited package space, the implementation of the shape of the exhaust connection unit for securing exhaust flow rate uniformity is limited.

In addition, in the case of a closed coupled type catalytic converter mounted directly on the exhaust side of the turbocharger, we have found that the exhaust flow velocity uniformity at the front end of the catalyst is non-uniform, and as a result, the exhaust gas flow is concentrated to one side, thereby deteriorating the back pressure.

The above information disclosed in this Background section is only for enhancement of understanding of the background of the present disclosure, and therefore it may contain information that does not form the prior art that is already known in this country to a person of ordinary skill in the art.

SUMMARY

Exemplary forms of the present disclosure is to improve the uniformity of the flow rate of the exhaust gas with respect to the front surface of the catalyst, and to provide a catalytic converter for a vehicle that can improve the back pressure due to the distribution of the flow rate.

In one form of the present disclosure, a catalytic converter for a vehicle includes: an inlet cone portion connected to an exhaust side of a turbocharger, a converter housing connected to the inlet cone portion and forming an exhaust gas flow passage, at least one catalyst element installed in the exhaust gas flow passage of the converter housing, and a pin member installed inside the inlet cone portion.

In one form of the present disclosure, the inlet cone portion may form a circular inlet end.

In another exemplary form of the present disclosure, the inlet cone portion may be provided with an insertion hole through which the pin member is inserted toward the center of the inlet end.

In some forms of the present disclosure, the inlet cone portion may include a fastening boss for fastening the pin member inserted into the insertion hole.

In some forms of the present disclosure, the pin member may include a head portion fastened to the fastening boss, and a pin shank portion integrally formed with the head portion.

In some forms of the present disclosure, the turbocharger is configured to generate a swirl flow of exhaust gas on the exhaust side of the turbocharger and the swirl flow is configured to cause a difference in exhaust gas flow rate distribution within the inlet cone portion, when the pin member is not attached to the inlet cone portion, a first region having a low flow rate uniformity is formed around a flow center in the inlet cone portion, and a second region having a high flow rate uniformity is formed an outer side of the first region in the inlet cone portion, and, the pin member may be installed inside the inlet cone portion to be perpendicular to the flow direction of the exhaust gas in the second region.

In some forms of the present disclosure, the pin member may be provided in a rectangular cross-sectional shape along a direction perpendicular to the flow direction of the exhaust gas.

In other form of the present disclosure, the length of the pin member may be equal to a radius of the first region.

Further, in an exemplary form of the present disclosure, the thickness of the pin member may be equal to thickness of the exhaust flow in the second region.

According to exemplary forms of the present disclosure, as the pin member is mounted on the inlet cone portion, exhaust flow uniformity and back pressure at the front end of the catalyst can be improved through flow velocity distribution in a region where the flow velocity is concentrated.

In addition, effects obtained or predicted due to forms of the present disclosure will be disclosed directly or implicitly in the detailed description of the forms of the present disclosure. That is, various effects predicted according to forms of the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The unrelated parts to the description of the exemplary forms are not shown to make the description clear and like reference numerals designate like element throughout the specification.

Further, the sizes and thicknesses of the configurations shown in the drawings are provided selectively for the convenience of description, so that the present disclosure is not limited to those shown in the drawings and the thicknesses are exaggerated to make some parts and regions clear.

Discriminating the names of components with the first, and the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" etc. used herein mean the units of inclusive components performing at least one or more functions or operations.

Figure 1:
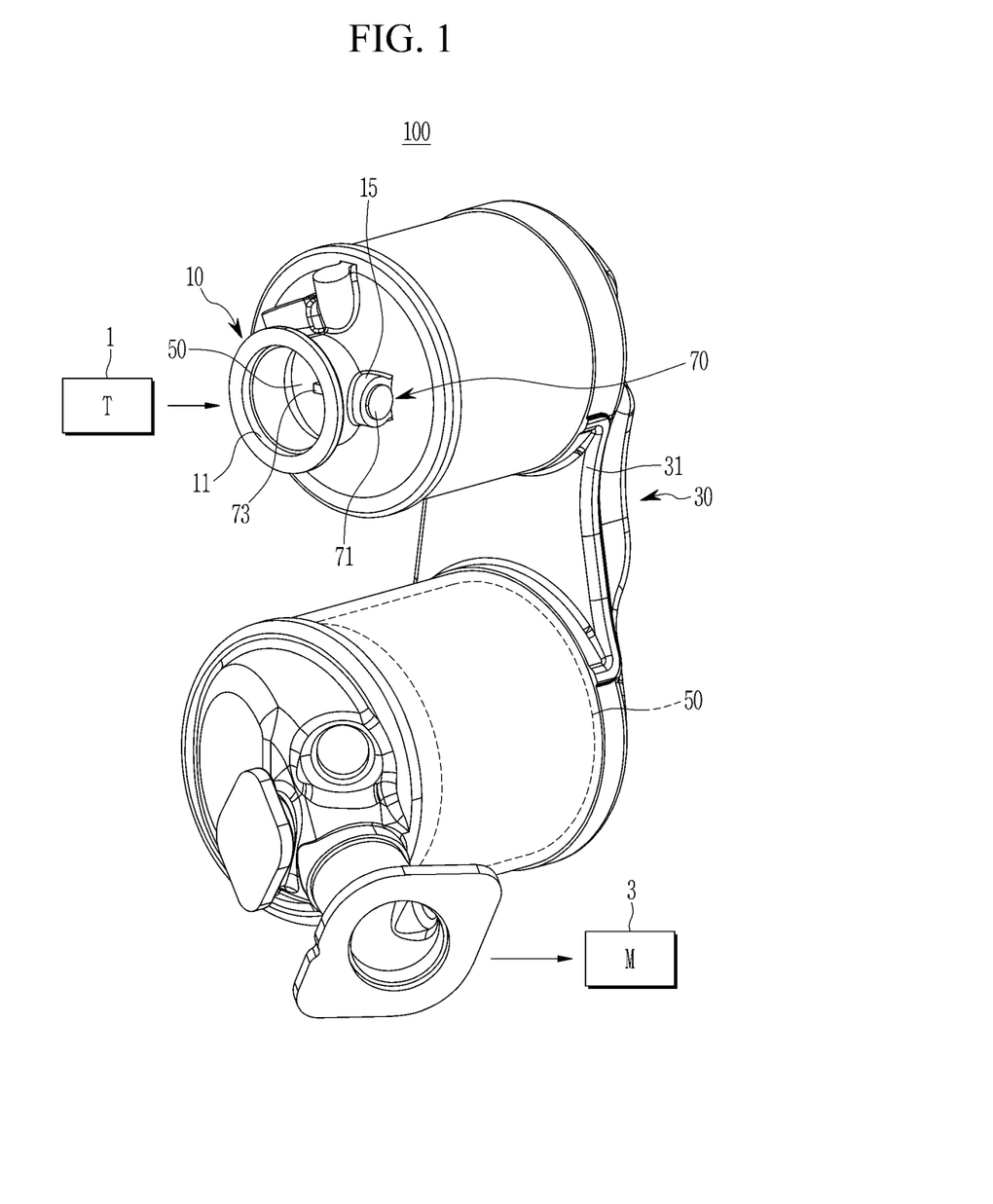
FIG. 1 is an exploded perspective view showing a catalytic converter for a vehicle according to an exemplary form of the present disclosure.
Figure 2:
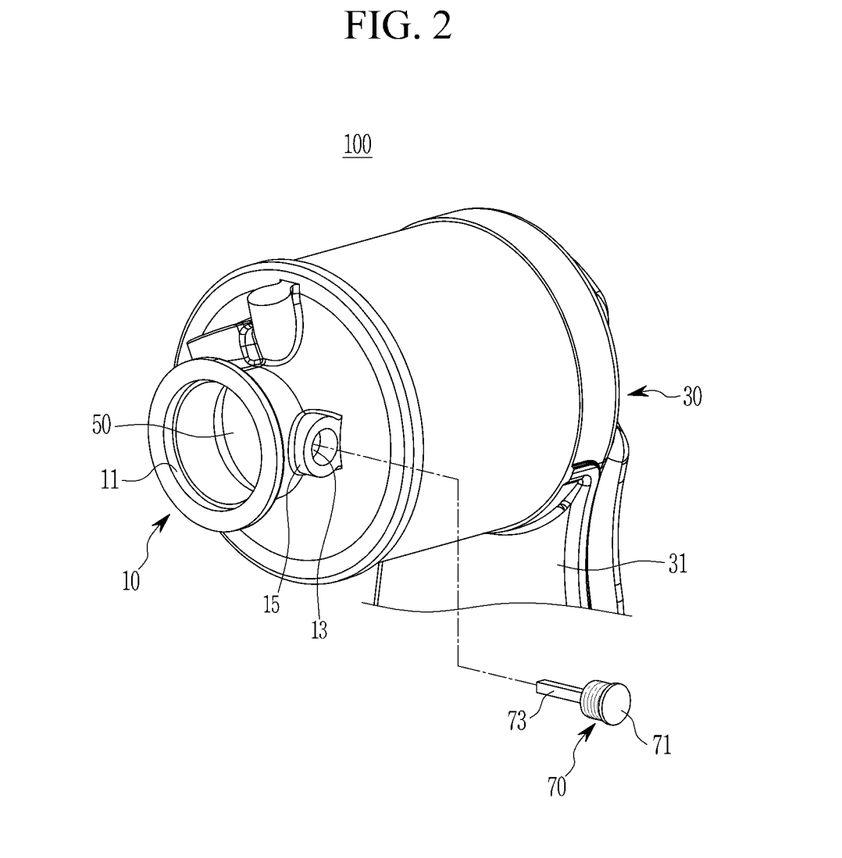
FIG. 2 is a combined perspective view showing a catalytic converter for a vehicle according to an exemplary form of the present disclosure.
Figure 3:
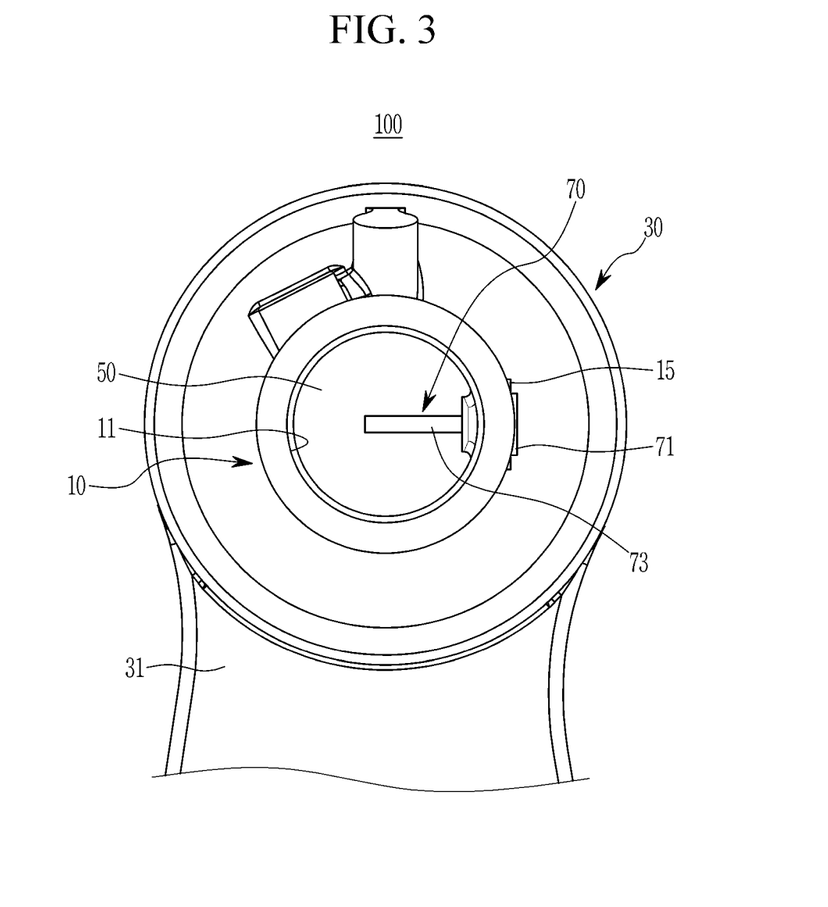
FIG. 3 is a front configuration diagram showing a catalytic converter for a vehicle according to an exemplary form of the present disclosure.

FIG. 1 is an exploded perspective view showing a catalytic converter for a vehicle according to an exemplary form of the present disclosure, FIG. 2 is a combined perspective view of FIG. 1, and FIG. 3 is a front configuration diagram of FIG. 2.

Referring to FIG. 1 to FIG. 3, the catalytic converter 100 for a vehicle may be applied to an exhaust system of a turbocharged engine vehicle.

For example, the exhaust system includes an engine (not shown), a turbocharger 1, a catalytic converter 100 in one form of the present disclosure (e.g., a warm-up catalytic converter), and a muffler 3.

Here, the catalytic converter 100 according to an exemplary form of the present disclosure, may be configured as a closed coupled type mounted directly on the exhaust side of the turbocharger 1.

The exhaust gas discharged from the engine in the above-described exhaust system flows into the turbocharger 1 through the exhaust manifold, discharges from the exhaust side (turbine side) of the turbocharger 1, and enters the catalytic converter 100. The catalytic converter 100 purifies harmful substances in the exhaust gas and discharges the purified exhaust gas to the muffler 3.

Since the configuration and function of the turbocharger 1 are well-known techniques well known in the art, detailed description of the configuration and function will be omitted herein.

Hereinafter, when the mounting position of the catalytic converter 100 is used as a reference (based on the drawing), upward parts (upper portion, upper end, upper surface, and upper end portion) will be defined as front end/front end portion, and downward parts (lower portion, lower end, lower surface, and lower end portion) will be defined as rear end/rear end portion.

However, the definition of the direction as described above is a relative meaning, and since the direction may vary depending on a reference position of the catalytic converter 100, the aforementioned reference direction is not necessarily limited to the reference direction of the present disclosure.

Further, the "end (one side/one side end, the other side/the other side end, front end or rear end)" in the following may be defined as either end and a certain portion (one side portion/one side end portion, the other side/the other side end portion, front end portion or rear end portion) including the end portion.

The catalytic converter 100 for a vehicle according to an exemplary form of the present disclosure can improve the uniformity of the flow rate of the exhaust gas with respect to the front surface of the catalyst, and is made of a structure capable of improving the back pressure due to the distribution of the flow rate.

In one form, the vehicle catalytic converter 100 includes an inlet cone portion 10, a converter housing 30, a catalytic element 50, and a pin member 70.

In an exemplary form of the present disclosure, the inlet cone portion 10 is provided as an exhaust connection unit directly connected to the exhaust side of the turbocharger 1. The inlet cone portion 10 allows the exhaust gas discharged from the exhaust side of the turbocharger 1 to flow.

The inlet cone portion 10 forms a circular inlet end 11 corresponding to the exhaust side of the turbocharger 1 having a circular shape. The distribution of the exhaust gas discharged from the exhaust side of the turbocharger 1 has the lowest flow velocity in the center of the swirl (Hereinafter referred to as the floating center) based on the swirl shape, and the highest flow velocity appears in the outer portion of the flow center.

Based on the flow rate distribution according to the swirl on the turbine side of the turbocharger 1, the inlet cone portion 10 forms a circular inlet end 11 corresponding to the flow center.

Furthermore, the inlet cone portion 10 has a predetermined length with the same diameter from the circular inlet end 11, and is provided in a shape that gradually increases in diameter toward the converter housing 30 to be further described later.

In an exemplary form of the present disclosure, the converter housing 30 may be composed of one housing or two or more housings connected to each other. Furthermore, the converter housing 30 may include accessory elements such as an inlet cone portion 10 and various brackets, ribs, blocks, plates, etc. to support various components to be further described below.

The converter housing 30 is connected to the inlet cone portion 10 through one end. The converter housing 30 forms an exhaust gas flow passage 31 that discharges exhaust gas flowing through one end from the inlet cone portion 10 through the other end. Here, the other end of the converter housing 30 may be connected to the muffler 3 through an exhaust pipe.

In an exemplary form of the present disclosure, the catalytic element 50 purifies exhaust gas flowing into the exhaust gas flow passage 31 of the converter housing 30 through the inlet cone portion 10 via a chemical reaction.

The catalytic element 50 is installed in the exhaust gas flow passage 31 of the converter housing 30. For example, the catalyst element 50 may be installed at one end and the other end side of the converter housing 30 in the exhaust gas flow passage 31, respectively.

Hereinafter, when the catalyst element 50 is installed on one side of the converter housing 30. As a reference, the front end surface of the catalyst element 50 is referred to as a catalyst front end surface for convenience.

In an exemplary form of the present disclosure, the pin member 70 changes the flow component in the region with the highest flow velocity, and generates a new swirl (vortex) in the region with the lowest flow velocity based on the flow rate distribution according to the swirl on the turbine side of the turbocharger 1 mentioned above.

The pin member 70 is installed inside the inlet cone portion 10 corresponding to the front end surface of the catalyst. The pin member 70 is inserted into the inlet cone portion 10 and can be fastened to the inlet cone portion 10.

To this end, the inlet cone portion 10 forms an insertion hole 13 for inserting the pin member 70 toward the center of the inlet end 11. In addition, the inlet cone portion 10 forms a fastening boss 15 for fastening the pin member 70 inserted into the insertion hole 13. The fastening boss 15 has an insertion hole 13 connected to the inside of the inlet cone portion 10, and is integrally formed with an outer circumferential surface of the inlet cone portion 10.

The pin member 70 as described above includes a head portion 71 fastened to the fastening boss 15 and a pin shank portion 73 formed integrally with the head portion 71. The pin shank portion 73 is inserted into the central side of the inlet end 11 of the inlet cone portion 10 through the fastening boss 15 and the insertion hole 13. And, in this state, the head portion 71 is bolted to the inner circumferential side of the insertion hole 13 and the fastening boss 15.

Figure 4:
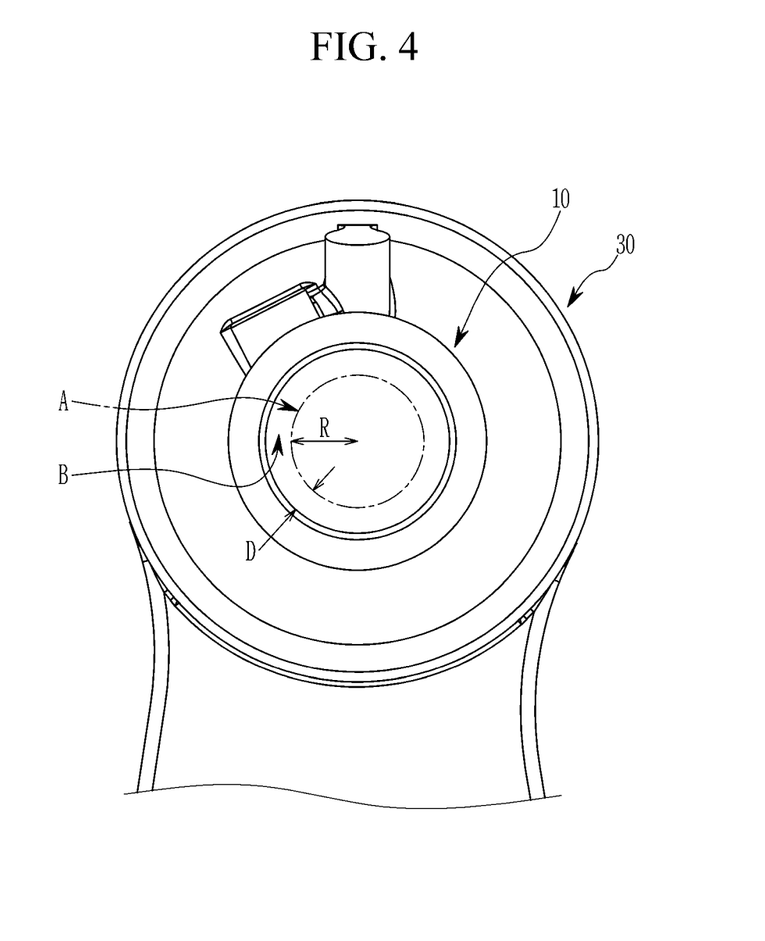
FIG. 4 is a view schematically showing a flow rate distribution according to a turbo charger swirl for explaining the configuration of a pin member applied to a catalytic converter for a vehicle according to an exemplary form of the present disclosure.

Hereinafter, as illustrated in FIG. 4, the mounting structure of the inlet cone portion 10 of the pin member 70 will be described based on the distribution of the exhaust gas flow rate in the inlet cone portion 10 according to the swirl flow on the exhaust side of the turbocharger 1. That is, the above-described exhaust gas flow rate distribution means a flow rate distribution in a state in which the pin member 70 is not attached to the inlet cone portion 10. The turbocharger generates the swirl flow of exhaust gas on the exhaust side of the turbocharger and the swirl flow causes a difference in exhaust gas flow rate distribution within the inlet cone portion.

In an exemplary form of the present disclosure, in the inlet cone portion 10, the flow center side (e.g., an area around a flow center of the exhaust gas in the inlet cone portion) is set to a first region A having a low flow rate uniformity, and the outer side of the flow center portion (e.g., an outer side of the first region in the inlet cone portion) is set to a second region B having a high flow velocity uniformity.

Figure 5A:
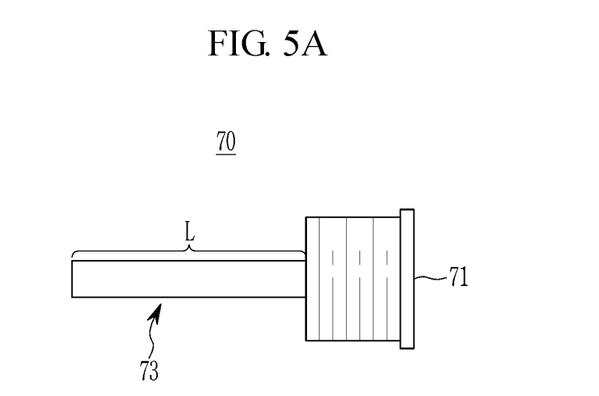
FIGS. 5A and 5B are views respectively showing the configuration of a pin member applied to a catalytic converter for a vehicle according to an exemplary form of the present disclosure.
Figure 5B:
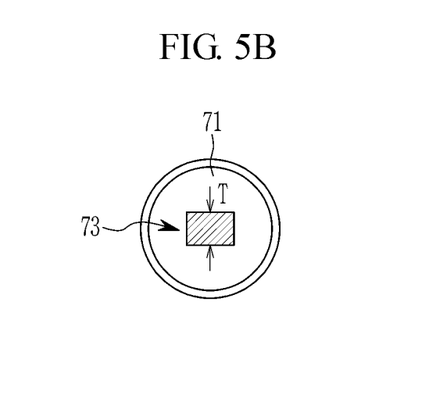

The pin member 70 according to an exemplary form of the present disclosure is installed inside the inlet cone portion 10 to be perpendicular to the flow direction of the exhaust gas in the second region B, as shown in FIGS. 4 and 5A-5B.

Here, the pin shank portion 73 of the pin member 70 is provided in a rectangular cross-sectional shape along a direction perpendicular to the flow direction of the exhaust gas. The reason for configuring the pin shank portion 73 in a rectangular cross-sectional shape is to change the flow path of the exhaust gas in the second region B to smoothly distribute the exhaust gas to the first region A.

However, the cross-sectional shape of the pin shank portion 73 is not necessarily limited to a rectangular shape, and may include circular, elliptical, and polygonal shapes as the cross-sectional shape.

Furthermore, the length (L) of the pin shank portion 73 in the pin member 70 is set to the radius R in the first region A. The pin shank portion 73 distributes exhaust gas flow from the second region B to the first region A along the longitudinal direction. Therefore, the length L of the pin shank portion 73 is set to the radius R in the first region A.

If the length L of the pin shank portion 73 is set to a length exceeding the radius R in the first region A, the exhaust gas flow in the first region A is not evenly distributed.

Furthermore, the thickness T of the pin shank portion 73 in the pin member 70 is set to the exhaust flow thickness D in the second region B. This is to smoothly change the exhaust gas flow path in the second region B through the pin shank portion 73.

Therefore, according to the vehicle catalytic converter 100 configured as described above, first, the exhaust gas discharged from the exhaust side of the turbocharger 1 flows into the converter housing 30 through the inlet cone portion 10.

At this time, if the pin member 70 is not mounted to the inlet cone portion 10, the inlet cone portion 10 has a low flow rate uniformity in the first region A of the flow center side, and the first side of the flow center portion In the region (B), the flow rate distribution has a high flow rate uniformity.

However, in the form of the present disclosure, since the pin member 70 is mounted on the inlet cone portion 10, as described above, in the process in which the exhaust gas flows into the inlet cone portion 10, the exhaust gas in the second region B changes the flow path while hitting the pin shank portion 73 having a rectangular cross-sectional shape. Then, the flow of the exhaust gas is guided to the first region A.

That is, the pin shank portion 73 changes the flow component in the second region B, and disperses the exhaust gas flow in the second region B into the first region A. Therefore, a new swirl (vortex) is generated in the first region A.

Thus, in one form of the present disclosure, as the swirl is formed in the flow center region where the flow velocity uniformity is low through the pin member 70 in the inlet cone portion 10, the flow velocity uniformity in the flow center portion can be increased.

According to the vehicle catalytic converter 100 according to an exemplary form of the present disclosure as described so far, as the pin member 70 is mounted on the inlet cone portion 10, exhaust flow uniformity and back pressure at the front end of the catalyst can be improved through flow velocity distribution in a region where the flow velocity is concentrated.

Figure 6:
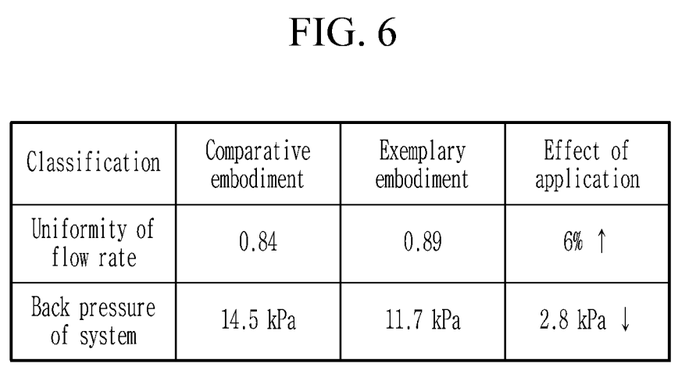
FIG. 6 is a table for explaining the effect of a catalytic converter for a vehicle according to an exemplary form of the present disclosure.

As shown in FIG. 6, comparing the form in which the pin member 70 is applied to the inlet cone part 10 and the comparative form in which the pin member 70 is not applied to the inlet cone part 10, it can be seen that the flow rate uniformity can be improved to about 6% compared to the comparative form, and the back pressure of the exhaust system can be reduced by 2.8 kPa.

Therefore, in an exemplary form of the present disclosure, the catalyst purification efficiency can be improved by improving the uniformity of the exhaust flow rate at the front end of the catalyst, the cost can be reduced through the reduction of precious metal materials, and the engine power is increased through the improvement of the back pressure.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 1: turbocharger | 3: muffler |
| 10: inlet cone portion | 11: inlet end |
| 13: insertion hole | 15: fastening boss |
| 30: converter housing | 31: exhaust gas flow passage |
| 50: catalyst element | 70: pin member |
| 71: head portion | 73: pin shank portion |
| A: first region | B: second region |
| L: length | R: radius |
| D, T: thickness | 100: catalytic converter |

What is claimed is:

1. A catalytic converter for a vehicle, comprising:
an inlet cone portion connected to an exhaust side of a turbocharger;
a converter housing connected to the inlet cone portion and configured to form an exhaust gas flow passage;
at least one catalyst element installed in the exhaust gas flow passage of the converter housing; and
a pin member installed inside the inlet cone portion; wherein:
the turbocharger is configured to generate a swirl flow of exhaust gas on the exhaust side of the turbocharger and the swirl flow is configured to cause a difference in exhaust gas flow rate distribution within the inlet cone portion,
when the pin member is not attached to the inlet cone portion, a first region having a low flow rate uniformity is formed around a flow center in the inlet cone portion, and a second region having a high flow rate uniformity is formed an outer side of the first region in the inlet cone portion, and
the pin member is installed inside the inlet cone portion to be perpendicular to a flow direction of the exhaust gas in the second region.

2. The catalytic converter for a vehicle of claim 1, wherein the inlet cone portion forms a circular inlet end.

3. The catalytic converter for a vehicle of claim 2, wherein:
the inlet cone portion is provided with an insertion hole through which the pin member is inserted toward a center of the circular inlet end, and
the inlet cone portion includes a fastening boss configured to fasten the pin member inserted into the insertion hole.

4. The catalytic converter for a vehicle of claim 3, wherein:
the pin member includes a head portion fastened to the fastening boss, and a pin shank portion integrally formed with the head portion.

5. The catalytic converter for a vehicle of claim 1, wherein:
the pin member is provided in a rectangular cross-sectional shape along a direction perpendicular to the flow direction of the exhaust gas.

6. The catalytic converter for a vehicle of claim 1, wherein: a length of the pin member is equal to a radius of the first region.

7. The catalytic converter for a vehicle of claim 1, wherein: a thickness of the pin member is equal to a thickness of the exhaust flow in the second region.

* * * * *